United States Patent [19]
Cipolli et al.

[11] Patent Number: 5,314,937
[45] Date of Patent: May 24, 1994

[54] SELF-EXTINGUISHING POLYMERIC COMPOSITIONS

[75] Inventors: Roberto Cipolli, Novara; Enrico Masarati, Castelnuovo Valtidone; Cristina Rossi, Rome; Roberto Oriani, Milan; Gilberto Nucida, San Giuliano Milanese, all of Italy

[73] Assignee: Ministero dell'Universita' e della Ricerca Scientifica, Rome, Italy

[21] Appl. No.: 1,527

[22] Filed: Jan. 6, 1993

[30] Foreign Application Priority Data

Jan. 10, 1992 [IT] Italy ............... MI92 A000030

[51] Int. Cl.$^5$ ............... C08K 5/3492; C08K 3/28
[52] U.S. Cl. ............... 524/100; 524/416
[58] Field of Search ............... 524/100, 416

[56] References Cited
U.S. PATENT DOCUMENTS
5,182,388 1/1993 Cipolli et al. ............... 544/195

FOREIGN PATENT DOCUMENTS
2100076 3/1972 France.
2367772 5/1978 France.

Primary Examiner—Kriellion S. Morgan
Attorney, Agent, or Firm—Oblon, Spivak, McClelland, Maier & Neustadt

[57] ABSTRACT

Self-extinguishing polymeric compositions endowed with high self-extinguishing characteristics when exposed to a flame, based on thermoplastic polymers endowed with elastomeric properties, in particular olefinic polymers or copolymers, comprising:

(a) from 90 to 40 parts by weight of a thermoplastic polymer, or a polymer with elastomeric properties;
(b) from 10 to 60 parts by weight of one or more derivatives of 2,4-diamino-1,3,5-triazinyl-6-phosphonic acid having the general formula (I):

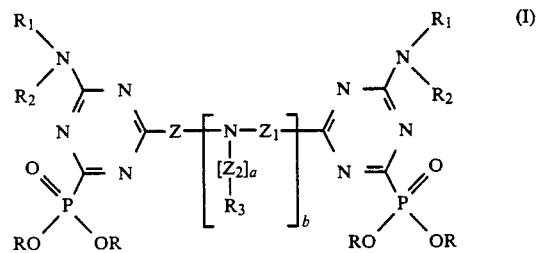

10 Claims, No Drawings

SELF-EXTINGUISHING POLYMERIC COMPOSITIONS

The present invention relates to self-extinguishing compositions based on thermoplastic polymers, or on polymers endowed with elastomeric properties, in particular olefinic polymers or copolymers, containing derivatives of 2,4-diamino-1,3,5-triazinyl-6-phosphonic acid, either alone, or together with small amounts of ammonium or amine phosphates and/or phosphonates.

In the art several solutions are known in order to reduce or eliminate the combustibility of polymers. Some of such solutions are based on the use of metal compounds, in particular compounds of antimony, bismuth or arsenic, jointly with partially halogenated, thermally unstable organic compounds, such as chlorinated paraffinic waxes.

Other solutions are based on the use of substances capable of causing intumescence. The formulations of intumescent type are generally constituted by the polymer and at least three main additives: one essentially phosphorus containing additive, the purpose of which is of forming, during the combustion, a semisolid, impermeable glassy layer essentially constituted by polyphosphoric acid, and of initiating the process of intumescence formation; a second, nitrogen containing, additive, which performs the task of foaming agent; and a third, carbon containing, additive, which acts as a carbon donor, in order to form an insulating, cellular carbonaceous layer (char) between the polymer and the flame.

Examples of these types of intumescent formulations are those as reported in the following patents: U.S. Pat. No. 3,810,862 (Phillips Petroleum Co.), based on melamine, pentaerythritol and ammonium polyphosphate; U.S. Pat. No. 4,727,102 (Vamp S.r.l), based on melamine cyanurate, a hydroxyalkyl derivative of isocyanuric acid and ammonium polyphosphate; and published patent application WO 85/05626 (Plascoat U. K. Limited), based on various phosphorus and nitrogen compounds among which, in particular, a combination of melamine phosphate, pentaerythritol and ammonium polyphosphate may be cited.

In more recent formulations, together with the use of an organic or inorganic phosphorus compound, a nitrogen containing organic compound was used, which generally is an aminoplastic resin obtained by means of the condensation of urea, melamine or dicyano diamide with formaldehyde.

Examples of double-additive formulations are those as reported in U.S. Pat. No. 4,504,610 (Montedison S.p.A.), based on oligomeric derivatives of 1,3,5-triazine and ammonium polyphosphate; and in European patent 14,463 (Montedison S.p.A.), based on organic compounds selected from benzylguanamine and reaction products of aldehydes with various nitrogen-containing cyclic compounds, in particular benzylguanamineformaldehyde copolymers, and ammonium polyphosphate.

Self-extinguishing compositions can also be obtained by using single-component additives, containing both nitrogen and phosphorus in their organic molecule, as disclosed in U.S. Pat. No. 4,201,705 (Borg-Warner Corp.).

These flame-retardant, intumescent systems endow the polymer which contains them with the property of giving rise to the formation of a carbonaceous residue following a fire or the application of a flame. These types of flame-retardant systems display a number of advantages: absence of phenomena of corrosion in the machinery on which polymers are processed; lower smoke emission than in those systems which contain metal compounds and halogenated hydrocarbons; and, above all, the possibility of endowing the polymers with satisfactory flame-retardant properties with a smaller amount of total additive, and, therefore, without an excessive decay in the mechanical properties of the same polymers.

The present inventors have now found that high flame retardant properties can be conferred to polymers by using single component additives, which make it possible to obtain polymeric compositions free from ammonium or amine phosphates or phosphonates. Alternatively, excellent flame retardant properties can be conferred by using, in combination with the above single component additives, an amount of ammonium or amine phosphates and/or phosphonates which is much smaller than previously used in the prior art.

Within the class of single-component additives, the use of derivatives of 2,4-diamino-1,3,5-triazinyl-6-phosphonic acid, generally as esters of N,N,N',N'-tetramethylol-2,4-diamino-1,3,5-triazinyl-6-phosphonic acid, as flame-retardant additives in intumescent coatings for cellulose and its derivatives, is known in the art.

For example, in the following U.S. Pat. Nos. 3,158,450; 3,165,513; 3,210,350; 3,650,670; 3,654,374, reference is made to the alkyl or alkenyl esters of 2,4-diamino-1,3,5-triazinyl-6-phosphonic acid bearing, on their amino groups, alkyl or aryl or methylol substituents, i.e., compounds which are capable of endowing wood, cotton and paper with flame retardant properties, but are unsuitable for conferring self-extinguishing characteristics to thermoplastic polymers or polymers endowed with elastomeric properties, even when used jointly with ammonium or amine phosphates.

Also the use of the monoester or of diaminotriazinylphosphnic acid in the free acid form, associated with the presence of the primary amino or methylolamino or alkylamino groups, does not enhance the characteristics thereof as a flame retardant additive for thermoplastic polymers.

Adding a suitably selected substituent into the structure of 2,4-diamino-1,3,5-triazinyl-6-phosphonic acid, as taught by DE 2,459,492 (Bayer AG), contributes to supply the additive with flame retardant properties for the above cited polymers, provided that it is co-formulated with ammonium or amine phosphate; but results in an insufficient heat stability.

In fact, these are monotriazinic derivatives which, besides having a limited heat stability, transmit this limitation to the polymeric compositions which contain them.

Contrarily to the prior art, the compounds according to the present invention, constituted by polytriazinic derivatives, display a high heat stability, hence retaining a high activity as flame retardants even after high temperature processing of the polymeric compositions which contain them.

The present Applicant has hence found that the use of the compounds according to the present invention makes it possible to obtain self-extinguishing polymeric compositions without the aid of other co-additives, which polymeric compositions are characterized by an extremely good heat stability both under thermooxidation conditions and during the processing steps, thus making it possible to carry out the processing process at higher temperatures than disclosed in the prior art.

Moreover, the polymeric compositions to which the products of the present invention are added display the additional advantage that, in the case of a fire, they cause a very moderate, non-obscuring smoke emission.

More specifically, the compositions according to the present invention comprise:
(a) from 90 to 40 parts by weight of a thermoplastic polymer, or of a polymer endowed with elastomeric properties;
(b) from 10 to 60, preferably from 15 to 45, of one or more derivatives of 2,4-diamino-1,3,5-triazinyl-6-phosphonic acid having the general formula (I):

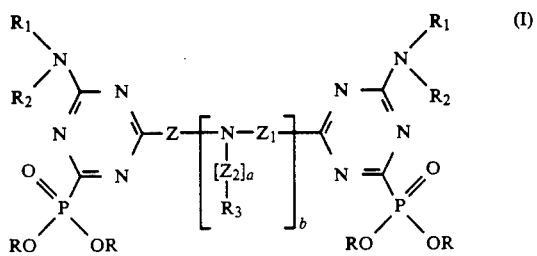
(I)

wherein:
the radicals R, which may be the same, or different from each other, are:
hydrogen; $C_1-C_5$ alkyl; $C_3-C_5$ hydroxyalkyl; $C_3-C_4$ alkenyl; cyclohexyl; $C_6-C_{10}$ aryl; $C_7-C_8$ aralkyl; or, taken jointly, may constitute a cyclic structure, as:

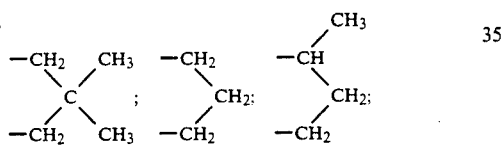

the radicals $R_1$ and $R_2$, which may be the same, or different from each other, and which may have different meanings on each triazinic ring, are:
H; $C_1-C_{18}$ alkyl; $C_2-C_8$ alkenyl; $C_6-C_{16}$ cycloalkyl or alkylcycloalkyl;

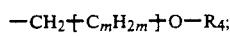

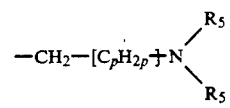

wherein:
m=an integer comprised within the range of from 1 to 7, and preferably of from 1 to 3;
p=an integer comprised within the range of from 1 to 5;
$R_4$=H; $C_1-C_8$ alkyl, preferably H or $C_1-C_4$ alkyl; $C_2-C_6$ alkenyl; $—[—C_qH_{2q}—]—O—R_6$ wherein q is an integer comprised within the range of from 1 to 4 and $R_6$ is H or $C_1-C_4$ alkyl; $C_6-C_{12}$ cycloalkyl or alkylcycloalkyl;
the radicals $R_5$, which may be the same, or different from each other, are:
H; $C_1-C_8$ alkyl; $C_2-C_6$ alkenyl; $C_6-C_{12}$ cycloalkyl or alkylcycloalkyl; $C_1-C_4$ hydroxyalkyl;
or the moiety:

is replaced by a heterocyclic radical linked to the alkyl chain through the nitrogen atom, and possibly containing another heteroatom preferably selected from O, S, N;
or in the general formula (I) the moiety:

is replaced by a heterocyclic radical linked to the triazinic ring through the nitrogen atom, and possibly containing another heteroatom preferably selected from O, S, N;
a is 0 (zero) or 1;
b is 0 (zero) or an integer comprised within the range of from 1 to 5;
$R_3$ is hydrogen or:

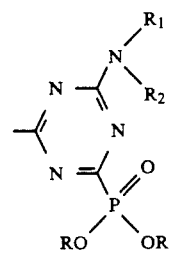

and its meaning may vary within each repeating unit; when b is 0 (zero), Z is a divalent radical falling within the scope of one of the following formulae:

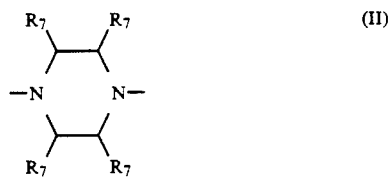
(II)

wherein the radicals $R_7$, which may be the same or different from each other, are hydrogen or $C_1-C_4$ alkyl;

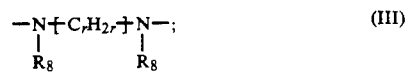
(III)

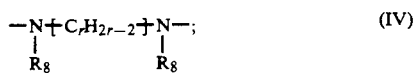
(IV)

wherein r is an integer comprised within the range of from 2 to 14; $R_8$ is hydrogen; $C_1-C_4$ alkyl; $C_2-C_6$ alkenyl; $C_1-C_4$ hydroxyalkyl;

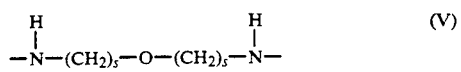
(V)

-continued $$-\overset{H}{\underset{|}{N}}-[(CH_2)_s-O]_{t}(CH_2)_s-\overset{H}{\underset{|}{N}}- \quad (VI)$$

wherein s is an integer comprised within the range of from 2 to 5 and t is an integer comprised within the range of from 1 to 3;

$$-\overset{H}{\underset{|}{N}}-\underset{R_9}{\underset{|}{\bigcirc}}-\overset{H}{\underset{|}{N}}- \quad (VII)$$

$$-\overset{H}{\underset{|}{N}}-\underset{R_9}{\underset{|}{\bigcirc}}-X-\underset{R_9}{\underset{|}{\bigcirc}}-\overset{H}{\underset{|}{N}}- \quad (VIII)$$

wherein:
X is a direct C—C bond; O; S; S—S; SO; SO$_2$; NH; NHSO$_2$; NHCO; N=N; CH$_2$;
R$_9$ is hydrogen; hydroxy; C$_1$-C$_4$ alkyl; C$_1$-C$_4$ alkoxy;

$$-NHCH_2-\underset{A}{\bigcirc}-CH_2NH- \quad (IX)$$

wherein A may be a saturated or unsaturated ring;

$$-HN-\overset{CH_3}{\underset{CH_3}{\overset{|}{C}}}-\underset{}{\bigcirc}\overset{CH_3}{\underset{NH-}{\overset{|}{C}}} \quad (X)$$

$$-HN-(CH_2)_s-N\diagup\diagdown N-(CH_2)_s-NH- \quad (XI)$$

wherein s has the above defined meaning;
when, on the contrary, b is an integer comprised within the range of from 1 to 5, the moiety:

$$-Z-\left[\underset{[Z_2]_a}{\underset{|}{N-Z_1}}\right]_b-$$

is a multivalent radical falling within the scope of one of the following formulae:

$$-\underset{R_{10}}{\underset{|}{N}}-(CH_2)_s-\left[\underset{|}{\underset{|}{N}}-(CH_2)_s-\right]_c\underset{R_{10}}{\underset{|}{N}}- \quad (XII)$$

wherein:
R$_{10}$ is hydrogen or C$_1$-C$_4$ alkyl;
c is an integer comprised within the range of from 1 to 5;

the indexes s, which may be the same, or different from each other, have the same meaning as defined hereinabove;

$$-\underset{R_{10}}{\underset{|}{N}}-\left[(CH_2)_w-N-\underset{\underset{R_{10}}{\underset{|}{N}}}{\overset{|}{(CH_2)_w-N}}\right]_d(CH_2)_w-\underset{R_{10}}{\underset{|}{N}}- \quad (XIII)$$

wherein:
R$_{10}$ has the same meaning as defined hereinabove;
w is an integer comprised within the range of from 2 to 4;
d is either 1 or 2.

Within the scope of general formula (I) also those derivatives fall which have an asymmetrical structure, in the sense that the radicals R$_1$ and R$_2$ may have different meanings on each triazinic derivative.

When a further increase in self-extinguishing characteristics is desired in the presence of a flame, of the polymeric compositions according to the present invention, to them from 1 to 25 parts by weight of one or more ammonium or amine phosphate(s) and/or phosphonate(s) is(are) added, in lieu of a same number of parts by weight of component (b).

Examples of radicals R in the general formula (I) are: methyl; ethyl; propyl; isopropyl; n-butyl; isobutyl; isopentyl; 3-hydroxypropyl; 3-hydroxy-3-methylpropyl; 3-hydroxy-2,2-dimethylpropyl; propenyl; butenyl; cyclohexyl; phenyl; 2-methylphenyl; 3-methylphenyl; 4-methylphenyl; 2,6-dimethylphenyl; 4-isopropylphenyl; 4-tert-butylphenyl; benzyl; 1-phenylethyl; and so forth.

Examples of radicals R$_1$ and R$_2$ are: methyl; ethyl; propyl; isopropyl; n-butyl; isobutyl; tert-butyl; n-pentyl; isopentyl; n-hexyl; tert-hexyl; octyl; tert-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylaminoethyl; 3-(N,N-dimethylamino)propyl; 4-(N,N-dimethylamino)butyl; 5-(N,N-dimethylamino)pentyl; 4-(N,N-diethylamino)butyl; 5-(N,N-diethylamino)pentyl; 5-(N,N-diisopropylamino)pentyl; 3-(N-ethylamino)propyl; 4-(N-methylamino)butyl; 4-(N,N-dipropylamino)butyl; 2-(N,N-diisopropylamino)ethyl; 6-(N-hexenylamino)hexyl; 2-(N-ethenylamino)ethyl; 2-(N-cyclohexylamino)ethyl; 2-(N-2-hydroxyethylamino)ethyl; 2-(2-hydroxyethoxy)ethyl; 2-(2-methoxyethoxy)ethyl; 6-(N-propylamino)hexyl; and so forth.

Examples of heterocyclic radicals which may replace the moiety:

in general formula (I) are:

aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which may replace the moiety:

are:

aziridine; pyrrolidine; piperidine; morpholine; thiomorpholine; piperazine; 4-methylpiperazine; 4-ethylpiperazine; and so forth.

Examples of divalent-Z-radicals are those which derive, by means of the removal of a hydrogen atom from each aminic group, from the following diaminic compounds:

piperazine; 2-methylpiperazine; 2,5-dimethylpiperazine; 2,3,5,6-tetramethylpiperazine; 2-ethylpiperazine; 2,5-diethylpiperazine; 1,2-diaminoethane; 1,3-diaminopropane; 1,4-diaminobutane; 1,5-diaminopentane; 1,6-diaminohexane; 1,8-diaminooctane; 1,10-diaminodecane; 1,12-diaminododecane; N,N'-dimethyl-1,2-diaminoethane; N-methyl-1,3-diaminopropane; N-ethyl-1,2-diaminoethane; N-isopropyl-1,2-diaminoethane; N-(2-hydroxyethyl)-1,2-diaminoethane; N,N'bis(2-hydroxyethyl)-1,2-diaminoethane; N-(2-hydroxyethyl)-1,3-diaminopropane; N-hexenyl-1,6-diaminohexane; N,N'-diethyl-1,4-diamino-2-butene; 2,5-diamino-3-hexene; 2-aminoethylether; (2-aminoethoxy)-methylether; 1,2-bis(2-aminoethoxy)ethane; 1,3-diaminobenzene; 1,4-diaminobenzene; 2,4-diaminotoluene; 2,4-diaminoanisole; 2,4-diaminophenol; 4-aminophenylether; 4,4'-methylenedianiline; 4,4'-diaminobenzanilide; 3-aminophenylsulfone; 4-aminophenylsulfone; 4-aminophenylsulfoxide; 4-aminophenyldisulfide; 1,3-bis(aminomethyl)benzene; 1,4-bis(aminomethyl)benzene; 1,3-bis(aminomethyl)cyclohexane; 1,8-diamino-p-mentane; 1,4-bis(2-aminoethyl)piperazine; 1,4-bis(3-aminopropyl)piperazine; 1,4-bis(4-aminobutyl)piperazine; 1,4-bis(5-aminopentyl)piperazine; and so forth.

Examples of multivalent radicals:

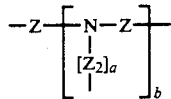

are those which derive, by elimination of a hydrogen atom from each reacted amino group, from the following polyaminic compounds:

bis(2-aminoethyl)amine; bis(3-aminopropyl)amine; bis(4-aminobutyl)amine; bis(5-aminopentyl)amine; bis[2-(N-methylamino)ethyl]amine; 2-N-butyl-bis(2-aminoethyl)amine; bis[3-(N-methylamino)propyl]amine; N-(3-aminopropyl)-1,4-diaminobutane; N-(3-aminopropyl)-1,5-diaminopentane; N-(4-aminobutyl)-1,5-diaminopentane; tris(2-aminoethyl)amine; tris(3-aminopropyl)amine; tris(4-aminobutyl)amine; tris[2-(N-ethylamino)ethyl]amine; N,N'-bis(2-aminoethyl)-1,2-diaminoethane; N,N'-bis(3-aminopropyl)-1,3-diaminopropane; N,N'-bis(2-aminoethyl)-1,3-diaminopropane; N,N'-bis(3-aminopropyl)-1,2-diaminoethane; N,N'-bis(3-aminopropyl)-1,4-diaminobutane; bis[2-(2-aminoethyl)aminoethyl]amine; N,N'-bis[2-(2-aminoethyl)aminoethyl]-1,2-diaminoethane; N,N'-bis[3-(2-aminoethyl)aminopropyl]-1,2-diaminoethane; N,N,N',N'-tetrakis(2-aminoethyl)-1,2-diaminoethane; and so forth.

Particularly preferred are those compounds of general formula (I) in which the radicals R mean hydrogen.

Specific compounds falling within the scope of the general formula (I) are reported in the examples which follow the present disclosure.

The derivatives of triazinylphosphonic acid of general formula (I) in which the radicals R are different from hydrogen or $C_3$-$C_5$ hydroxyalkyl, can be synthesized by causing a cyanuric halide, e.g., cyanuric chloride, to react, at a temperature comprised within the range of from 0° to 200° C., in the presence, or less, of a suitable solvent (such as, e.g., acetone, toluene, xylene, and so forth) with a phosphite having the general formula (XIV):

$$P(OR)_3 \quad (XIV)$$

wherein R has the meaning as defined hereinabove (except for hydrogen and $C_3$-$C_5$ hydroxyalkyl), in order to yield the intermediate having the general formula (XV):

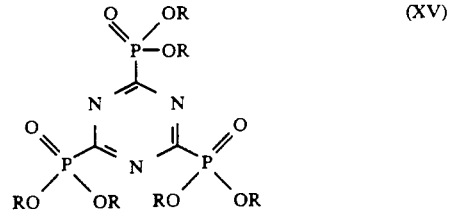

Examples of phosphite are: trimethylphosphite; triethylphosphite; tripropylphosphite; triisopropylphosphite; tributylphosphite; triisobutylphosphite; triisopentylphosphite; triallylphosphite; trimethylallylphosphite; tricyclohexylphosphite; triphenylphosphite; tri(2-methylphenyl)phosphite; tri(3-methylphenyl)phosphite; tri(4-methylphenyl)phosphite; tri(2,6-dimethylphenyl)phosphite; tri(4-isopropenylphenyl)phosphite; tri-(4-tert-butenylphenyl)phosphite; 2-methoxy-1,3,2-dioxaphosphorinane; 2-methoxy-4-methyl-1,3,2-dioxaphosphorinane; 2-methoxy-5,5-dimethyl-1,3,2-dioxaphosphorinane.

Such an intermediate, which may be separated or not, is caused to react, at a temperature comprised within the range of from 0° to 40° C., in a solvent (such as, e.g., ethyl alcohol, xylene, dimethylsulfoxide, dimethylformamide, and so forth), with a polyamine having the general formula (XVI):

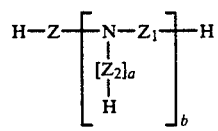

corresponding to one of the structures falling within the scope of the general formulae from (II) to (XIII), to yield the intermediate having the general formula (XVII):

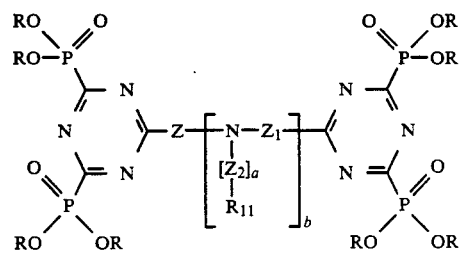

wherein $R_{11}$ is either hydrogen, or:

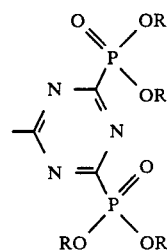

and its meaning may vary within each repeating unit.

Such an intermediate, which may be separated, or less, is subsequently caused to react, under analogous conditions to the preceding ones, with an amine having the general formula (XVIII):

wherein:

$R_1$ and $R_2$ have the same meaning as defined hereinabove, with the derivative of general formula (I) being obtained.

An alternative route for the synthesis consists, obviously, in causing the intermediate (XV) to react first with the amine (XVIII) and then with the polyamine (XVI).

The intermediate of general formula (XVII) can alternatively be prepared by first causing the cyanuric halide, e.g., cyanuric chloride, to react with the polyamine having the general formula (XVI), to yield the intermediate of general formula (XIX):

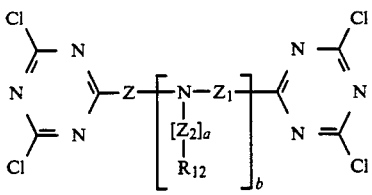

wherein $R_{12}$ is either hydrogen or:

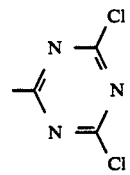

and its meaning may vary within each repeating unit, and subsequently the intermediate of general formula (XIX) to react with the phosphite having the general formula (XIV).

A further alternative route consists in causing the cyanuric halide to react with the amine of general formula (XVIII) to yield the intermediate of general formula (XX):

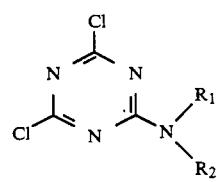

which subsequently is reacted with the phosphite of general formula (XIV), with the intermediate of general formula (XXI) being obtained:

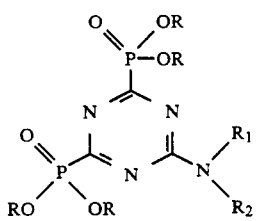

which, in its turn, is caused to react with the polyamine of general formula (XVI).

From the compounds of general formula (I) in which the radicals R are different from hydrogen (preferably $C_1$–$C_2$ alkyl), or, taken jointly, form a cycle, the corresponding free acids (in which R is hydrogen and/or hydroxyalkyl) are obtained by means of a hydrolysis reaction.

The reaction of hydrolysis is preferably carried out by using the method described by T. Morita, Y. Okamoto and H. Sakurai, Bulletin of Chemical Society of Japan 54, 267–273 (1981), which makes it possible to obtain, under very mild conditions, triazinylphosphinic acids with a good yield (higher than 70%).

As to that method, for the phosphinic acids of general formula (I), the separation as aniline or cyclohexylamine salts is not necessary, and the hydrolysis may also take place in water.

The phosphonic ester is first reacted with trimethylchlorosilane and sodium or potassium iodide, in order to yield the polykis(trimethylsilyl)phosphonate of general formula (XXII):

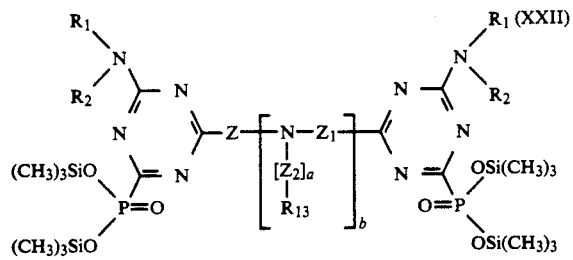

wherein $R_{13}$ is either hydrogen or:

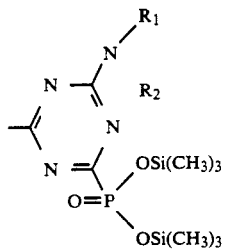

and its meaning may vary inside each repeating unit, at temperature comprised within the range of from 20° to 50° C. in acetonitrile and the intermediate (XXII) is subsequently submitted to a hydrolysis reaction by treating it with methyl alcohol or water, at temperatures comprised within the range of from 10° to 30° C., to yield the phosphonic acids of general formula (I).

In general, good quality products are obtained as white crystalline powder, which, as already briefly mentioned, need not be transformed into the corresponding aniline or cyclohexylamine salts in order to be separated.

The products of general formula (I) obtained in that way can be used in the self-extinguishing polymeric compositions without any further purifications.

Among the phosphates, ammonium polyphosphates falling within the scope of the general formula $(NH_4)_{n+2}P_nO_{3n+1}$ in which n represents an integer equal to, or larger than, 2, are preferred; the molecular weight of the polyphosphates should be high enough, in order to secure a low water solubility. For indicative purposes, n is preferably comprised within the range of from 2 to 500.

The composition of the polyphosphates having the above formula in which n is a large enough numeral, preferably comprised within the range of from 50 to 500, practically is the one which corresponds to the formula of metaphosphates $(NH_4PO_3)_n$.

An example of such polyphosphates is the product known with the trade name "Exolit 422" (manufactured and marketed by the company Hoechst) and having the composition $(NH_4PO_3)_n$ in which n is higher than 50; another example is the product known with the trade name "Phos-Chek P/40" (Monsanto Chemical) and having an analogous composition.

Another polyphosphate which can be advantageously used, above all thanks to its low water solubility, is the product known with the trade name "Exolit 462" (manufactured and marketed by the company Hoechst) and corresponding to Exolit 422 microencapsulated in melamine-formaldehyde resin.

Other useable phosphates are those deriving from amines, such as, e.g., dimethylammonium or diethylammonium phosphate, ethylenediamine phosphate, melamine ortho or pyrophosphate.

Among phosphonates, very good results were obtained by using (mono- or polysubstituted) ammonium phosphonates derived from mono- and polyphosphonic acids, examples of which are: ethane-1,1,2-triphosphonic acid; 2-hydroxyethane-1,1,2-triphosphonic acid; propane-1,2,3-triphosphonic acid; methylphosphonic acid; ethylphosphonic acid; n-propylphosphonic acid; n-butylphosphonic acid; phenylphosphonic acid; 1-aminoethane-1,1-diphosphonic acid; 1-hydroxyethane-1,1-diphosphonic acid; 1-hydroxydodecane-1,1-diphosphonic acid; phosphonoacetic acid; 2-phosphonopropionic acid; 3-phosphonopropionic acid; 2-phosphonobutyric acid; 4-phosphonobutyric acid; aminotris(methylenephosphonic) acid; ethylenediaminotetra(methylenephosphonic) acid; hexamethylenediaminotetra(methylenephosphonic) acid; diethylenetriaminopenta(methylenephosphonic) acid; and so forth.

Among those polymers which can be used in the compositions of the present invention, preferred are polymers or copolymers of olefins having the general formula $R-CH=CH_2$ wherein R is a hydrogen atom or a $C_1$-$C_8$ alkyl or aryl radical, in particular:

1. isotactic or prevailingly isotactic polypropylene;
2. HDPE, LLDPE, LDPE polyethylene;
3. crystalline propylene copolymers with minor proportions of ethylene and/or other alpha-olefins, such as, e.g., 1-butene, 1-hexene, 1-octene, 4-methyl-1-pentene;
4. heterophasic compositions comprising: (A) a homopolymeric propylene fraction, or one of those copolymers as per above (3) point, and (B) a copolymeric fraction formed by elastomeric ethylene copolymers with an alpha-olefin, possibly containing minor proportions of a diene, wherein the alpha-olefin is preferably selected from propylene and 1-butene;
5. elastomeric ethylene copolymers with alpha-olefins, possibly containing minor proportions of a diene.

Examples of dienes which are more commonly contained in the above said elastomeric copolymers are butadiene, ethylidene-norbornene, hexadiene 1-4.

Among polymers of olefins having the formula $R-CH=CH_2$ in which R is an aryl radical, "crystal" polystyrene and high-impact polystyrene are preferred.

Other examples of polymers which may commonly be used are acrylonitrile/butadiene/styrene (ABS) and styrene/acrylonitrile (SAN) copolymers; (polyester and polyether) polyurethane; poly(ethylene terephthalate); poly(butylene terephthalate); polyamides; and so forth.

The self-extinguishing compositions of the present invention can be prepared according to well-known methods: for example, ammonium or amine phosphate and/or phosphonate, if used, is intimately mixed with with one or more compound(s) of general formula (I) in finely ground form (preferably with smaller particle size than 70 micrometers), and the resulting mixture is added to the polymer in a turbomixer, in order to form a homogeneous blend which is extruded and pelletized. The resulting granular product can be processed and converted into various articles of manufacture according to any of the well-known moulding techniques.

The flame-retardant additives according to the present invention are suitable for use also in the field of flame-retardant paints.

Derivatives of 2,4-diamino-1,3,5-triazinyl-6-phosphonic acid falling within the scope of general formula (I), not cited in the examples, but equally well advantageously useable in the self-extinguishing polymer compositions of the present invention, are those as reported in Table 1. Wherein $R_3$, when present, is replaced by the triazinic ring of formula:

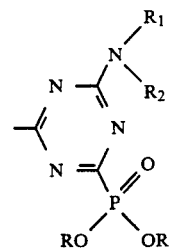

TABLE 1

| PRODUCT No | R | $R_1-N-R_2$ | $-Z-[N(-Z_1)-[Z_2]_a]_b$ |
|---|---|---|---|
| 1 | $CH_3$ | $(CH_2)_3OCH_3$  $(CH_2)_3OCH_3$ | $-HN-(CH_2)_3-NH-$ |
| 2 | phenyl | morpholino | piperazino |
| 3 | H | pyrrolidino | $-HN-(CH_2)_3-N-(CH_2)_3NH-$ |
| 4 | $CH_3$ | morpholino | $-HN(CH_2)_3-N\phantom{X}N-(CH_2)_3NH-$ (piperazine) |
| 5 | $C_2H_5$ | $t-C_4H_9$   H | piperazino |
| 6 | $n-C_4H_9$ | thiomorpholino | $-HNCH_2CH_2NH-$ |
| 7 | $C_2H_5$ | $CH_2CH_2CH_2N(morpholino)$   H | piperazino |
| 8 | H | $(CH_2)_4OCH_3$   H | $-N(CH_3)-CH_2CH_2-N(CH_3)-$ |
| 9 | H | $(CH_2)_2O(CH_2)_2OH$   H | $-HN-(CH_2)_4NH-$ |
| 10 | $CH_3$ | $(CH_2)_5OH$   H | piperazino |
| 11 | $C_2H_5$ | $CH_2CH_2OCH=CH_2$   H | $-HN-C_6H_4-COHN-C_6H_4-NH-$ |

TABLE 1-continued $$-Z\left[-N-Z_1\atop{[Z_2]_a}\right]_b$$

| PRODUCT No | R | R₁—N—R₂ | | Z structure |
|---|---|---|---|---|
| 12 | i-C$_3$H$_7$ | CH$_2$CH$_2$OCH$_3$ | H | —NCH$_2$CH$_2$NH— <br> \|<br>CH$_2$CH$_2$OH |
| 13 | H | CH$_2$CH$_2$OCH$_3$ | H | —HN—C(CH$_3$)$_2$—(cyclohexyl with CH$_3$)—NH— |
| 14 | CH$_3$ | morpholine (N–O ring) | | —HN(CH$_2$CH$_2$O)$_2$CH$_2$CH$_2$NH— |
| 15 | C$_2$H$_5$ | thiomorpholine (N–S ring) | | —HNCH$_2$CH$_2$OCH$_2$CH$_2$NH— |
| 16 | H | CH$_2$CHOH <br> \|<br>CH$_3$ | H | N(CH$_2$CH$_2$CH$_2$NH—)$_3$ |
| 17 | CH$_3$ | cyclohexyl | H | —N(piperazine)N— |
| 18 | H | morpholine (N–O ring) | | —N(C$_2$H$_5$)—CH$_2$—CH=CH—CH$_2$—N(C$_2$H$_5$)— |
| 19 | cyclohexyl | CH$_2$CH$_2$OCH$_3$ | H | —N(piperazine)N— |
| 20 | CH$_3$ | (CH$_2$)$_3$N(C$_2$H$_5$)$_2$ | H | —N(piperazine)N— |
| 21 | C$_2$H$_5$ | (CH$_2$)$_3$OH | H | —HNCH$_2$—(cyclohexyl)—CH$_2$NH— |
| 22 | H | morpholine (N–O ring) | | —HNCH$_2$CH$_2$—N(H)—CH$_2$CH$_2$NH— |
| 23 | H | morpholine (N–O ring) | | —HN—(phenylene)—NH— |

TABLE 1-continued

| PRODUCT No | R | $R_1-N-R_2$ | | $-Z-\left[\begin{array}{c}N-Z_1 \\ |\\ [Z_2]_a \\ |\end{array}\right]_b-$ |
|---|---|---|---|---|
| 24 | $CH_3$ | $CH_2CH_2OCH_3$ | $CH_2CH_2OCH_3$ | $-N\underset{\diagup}{\overset{\diagdown}{\diagdown}}\underset{\diagdown}{\overset{\diagup}{\diagup}}N-$ |

The structures of the compounds of general formula (I) reported in the examples were confirmed by NMR analysis.

The examples reported in the following illustrate the features of the invention without limiting them.

EXAMPLE 1

184.5 g of cyanuric chloride and 1 liter of toluene are charged to a reactor of 3 liters of capacity, equipped with stirrer, thermometer, dripping funnel, reflux condenser and heating bath.

The dispersion is stirred at room temperature, then 498.5 g of triethylphosphite are fed during approximately 4 hours.

The reaction is initially exothermic and the temperature reaches the value of 45° C.; then, the temperature is kept at the value of 45° C. by heating the reaction mass from the outside.

When the addition of the reactant is complete, the temperature is increased to 70° C. and the reaction mass is kept at that temperature, with stirring, for about 6 hours, until the development of ethyl chloride ceases. A homogeneous solution is obtained.

The solvent is then distilled off; the residue from the distillation of the product, after being cooled down to room temperature, is taken up with 300 cm³ of n-hexane.

The resulting product is filtered and is washed on the filter with n-hexane.

By drying the filter cake in a vacuum oven at 70° C., 463.1 g of intermediate (XXIII):

(XXIII)

are obtained as a crystalline product having m.p.=91°-94° C. (m.p.=melting point) and containing 19.38% of phosphorus (theoretical value: 19.02%).

400 cm³ of ethyl alcohol, 146.7 g of intermediate (XXIII) and, with stirring, 12.9 g of piperazine are charged to a reactor of 1 liter of capacity, equipped as the preceding one.

The reaction mixture is kept stirred at room temperature for 24 hours.

The solvent is then distilled off and the oil which constitutes the distillation residue is taken up with 300 cm³ of a mixture constituted by n-hexane and ethyl ether in the ratio 1:3.

The product which precipitates is filtered off and is washed on the filter with the same mixture.

By drying the filter cake in a vacuum oven, 108.4 g of intermediate (XXIV):

(XXIV)

are obtained as a white crystalline powder having m.p.=122°-124° C. and containing 15.61% of phosphorus (theoretical value: 15.74%).

The structure of intermediates (XXIII) and (XXIV) was further confirmed by NMR analysis.

250 cm³ of dimethylsulfoxide and, with stirring, 78.8 g of intermediate (XXIV) and 19.2 g of morpholine are charged to the same reactor of 1 liter of capacity.

The reaction mass is kept with stirring at room temperature for about 40 hours, then the formed product is precipitated by pouring the reaction mixture into 700 g of an ice-water mixture.

The separated product is filtered off and is washed on the filter with water.

By drying the filter cake in an oven at 100° C., 55.1 g of the product:

are obtained as a white crystalline powder having m.p.=225°-228° C. and containing 9.16% of phosphorus (theoretical value: 9.04%).

EXAMPLE 2

92.2 g of cyanuric chloride and 300 cm³ of acetone are charged to a reactor of 1 liter of capacity equipped as in Example 1.

With the reaction mixture being kept cooled from the outside at the temperature of 0°-5° C., during a 1 hour time 21.3 g of piperazine dissolved in 200 cm³ of acetone are added.

Still at the temperature of 0°–5° C., 20 g of sodium hydroxide in 100 cm³ of water are added.

The reaction mixture is kept stirred at 5° C. for a further 4 hours, then 200 cm³ of cold water are added, the formed precipitate is filtered and is washed on the filter with water.

After drying, 88.7 g of intermediate (XXV):

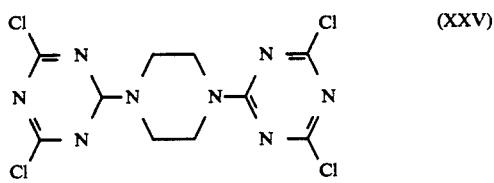
(XXV)

are obtained as a white crystalline powder having a higher m.p. than 300° C., and containing 37.4% of chlorine (theoretical value: 37.2%).

The structure of intermediate (XXV) was confirmed by IR spectroscopic analysis.

To a reaction equipment of 2 liters of capacity equipped as in Example 1, 700 cm³ of xylene, 76.4 g of intermediate (XXV) and 146.1 g of triethylphosphite are charged.

The temperature of the mixture is gradually increased up to solvent boiling temperature, and the reaction mixture is kept refluxing for about 8 hours.

A portion of the solvent is distilled off and the residue of distillation is first cooled down to room temperature and subsequently treated with 400 cm³ of a mixture constituted by n-hexane/ethyl ether in the ratio 2:1.

The resulting product is filtered off and is washed on the filter with the same mixture.

By drying in a vacuum oven at 60° C., 123.5 g of intermediate (XXIV) are obtained as a slightly coloured crystalline product having m.p.=120°–123° C. and containing 15.36% of phosphorus (theoretical value: 15.74%).

The structure of the intermediate was confirmed by NMR analysis.

To the same reactor of 1 liter of capacity as used previously, 250 cm³ of dimethylsulfoxide, 78.8 g of intermediate (XXIV) and 15.0 g of 2-methoxyethylamine are charged.

The mixture is kept stirred at room temperature for about 40 hours, then the reaction solution is added to 400 g of an ice-water mixture. The product does not precipitate, so it is extracted with 4 portions of ethyl acetate, each portion being of 200 cm³. The organic extracts are thoroughly dried and the solvent is distilled off.

A thick oil is obtained which, when treated with 300 cm³ of a mixture constituted by ethyl ether/n-hexane in the ratio 3:1, yields a white precipitate.

The resulting product is filtered off and is washed on the filter with the same mixture.

By drying the filter cake in a vacuum oven at 60° C., 62.3 g of product:

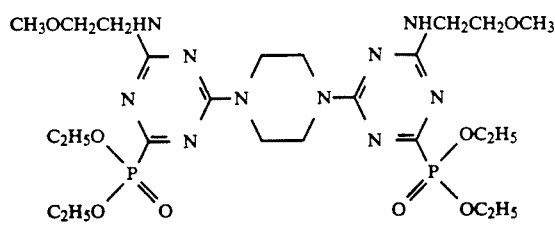

are obtained as a white crystalline powder having m.p.=145°–147° C. and containing 9.31% of phosphorus (theoretical value: 9.36%).

EXAMPLE 3

To the same reactor of 1 liter of capacity as of the preceding example, 450 cm³ of acetonitrile, 41.2 g of the product of Example 1 and 36.0 of sodium iodide are charged.

The reaction mixture is heated to 40° C. and, with the temperature being kept at that value, 26.1 g of trimethylchlorosilane are fed during 40 minutes.

The reaction is kept stirred at 40° C. for a further 2 hours, then is cooled to room temperature and the reaction mass is filtered, in order to remove sodium chloride formed during the reaction; the residue is washed on the filter with acetonitrile.

The solvent is distilled off under reduced pressure, at about 40° C., and the distillation residue is treated with 200 cm³ of methyl alcohol at room temperature.

The resulting product is filtered off and is washed on the filter with methyl alcohol.

By drying the filter cake in an oven at 100° C., 31.7 g of the product:

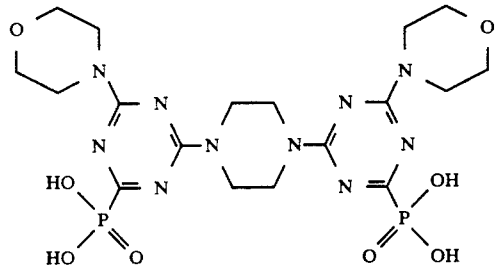

are obtained as a white crystalline powder having a higher m.p. than 300° C., and containing 10.26% of phosphorus (theoretical value: 10.78).

EXAMPLE 4

700 cm³ of ethyl alcohol, 146.7 of intermediate (XXIII) of Example 1 and, with stirring, 26.1 g of morpholine, are charged to a reactor of 2 liters of capacity, equipped as in the preceding example.

The mixture is kept stirred at room temperature for 3 hours.

The solvent is then distilled off and the oil which constitutes the distillation residue is taken up with 500 cm³ of a mixture constituted by n-hexane and ethyl ether in the ratio 1:4.

The separated product is filtered and is washed on the filter, with the same mixture.

By vacuum drying, 126.9 of intermediate (XXVI):

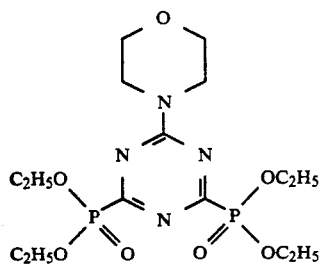

(XXVI)

are obtained as a crystalline product having m.p.=73°–75° C. and containing 13.82% of phosphorus (theoretical value: 14.15%).

The structure of intermediate (XXVI) was confirmed by NMR analysis.

250 cm³ of N,N-dimethylformamide, 87.6 g of intermediate (XXVI) and 6.0 g of ethylenediamine are charged to a reactor of 0.5 l of capacity, equipped as the preceding one.

The reaction mixture is kept stirred at room temperature for 42 hours, and then the process is continued according to the same operating modalities as disclosed in Example 1.

55.3 g of the product:

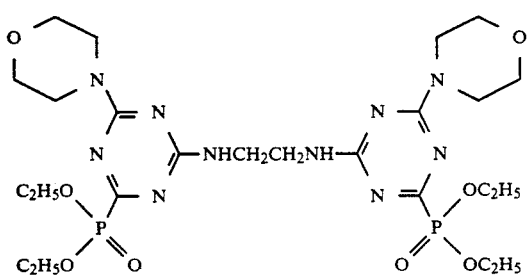

are obtained as a white crystalline powder having m.p.=203°–207° C. and containing 9.17% of phosphorus (theoretical value: 9.39%).

EXAMPLE 5

800 cm³ of toluene and 110.7 g of cyanuric chloride are charged to the same reactor of 2 liters of capacity of Example 1.

The dispersion is heated to 80° C. and during approximately 2 hours, 224 g trimethylphosphite are fed. The development of methyl chloride starts immediately. The reaction mixture is kept stirred at 80° C. for a further hour, then is heated to its boiling temperature and is kept refluxing for about 1 hour, until the development of methyl chloride ceases. A homogeneous solution is obtained.

The reaction mixture is allowed to cool to room temperature; a precipitate forms as white crystals. The reaction mixture is further cooled to 5° C., the product is filtered off and is washed on the filter firstly with xylene and then with n-hexane.

By drying the filter cake in a vacuum oven at 70° C., 233.8 g of the intermediate (XXVII):

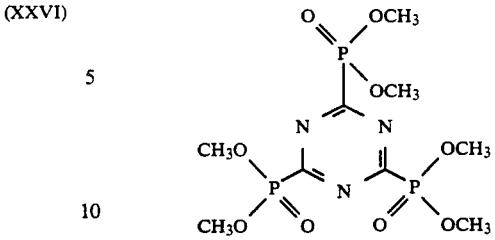

(XXVII)

are obtained as a white crystalline powder having m.p.=119°–122° C. and containing 22.77% of phosphorus (theoretical value: 22.96%).

400 cm³ of ethyl alcohol, 101.2 of intermediate (XXVII) and, with stirring, 10.6 g of piperazine are charged to a reactor of 1 liter of capacity, equipped as the preceding one.

The reaction is kept stirred at room temperature for 20 hours.

The solvent is then distilled off and the distillation residue is taken up with 250 cm³ of a mixture constituted by n-hexane and ethyl ether in the ratio 1:3.

The formed product is filtered off and is washed on the filter with the same mixture.

By drying the filter cake in a vacuum oven, 75.7 g of intermediate (XXVIII):

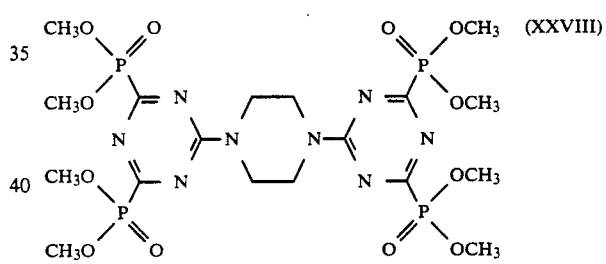

(XXVIII)

are obtained as a white crystalline powder having m.p.=164°–168° C. and containing 18.06% of phosphorus (theoretical value: 18.34%).

The structure of intermediates (XXVII) and (XXVIII) was further confirmed by NMR analysis.

400 cm³ of anhydrous ethyl alcohol and 67.6 g of intermediate (XXVIII) are charged to the same reactor of 1 liter of capacity, but now equipped with a cooling bath.

The reaction mixture is stirred until a solution is obtained, then the solution is cooled to 0°–3° C. from the outside, and the solution is saturated with ammonia gas.

The temperature is allowed to rise to 10°–15° C. and the reaction is kept stirred for about 20 hours.

A portion of the solvent is distilled off at room temperature, under reduced pressure, and a precipitate is formed.

The product is filtered off and is washed with ethyl alcohol on the filter.

By oven drying at 100° C., 41.1 g of product:

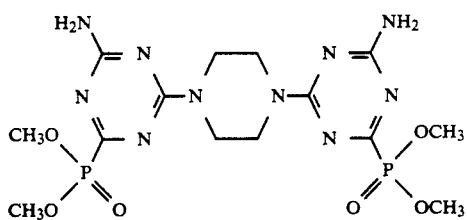

are obtained as a white crystalline powder having a higher m.p. than 300° C., and containing 12.15% of phosphorus (theoretical value: 12.65%).

EXAMPLE 6

500 cm³ of acetonitrile, 39.2 g of the product of Example 5 and 48.0 g of sodium iodide are charged to the same reactor of 1 liter of capacity as of the preceding example.

The mixture is heated to 40° C. and, at such a temperature, 34.7 of trimethylchlorosilane are charged within a 1 hour time.

The mixture is kept at 40° C. for a further 4 hours.

In this case, the silyl ester is insoluble in acetonitrile, so the reaction mixture is filtered, with both the resulting product and sodium chloride formed being separated.

The residue is treated with 300 cm³ of water at room temperature, with sodium chloride being thereby dissolved and the silyl ester being hydrolysed.

The mixture is kept stirred at room temperature for about 4 hours, then the resulting product is filtered off and is washed with water on the filter.

By oven drying the filter cake at 100° C., 30.8 g of product:

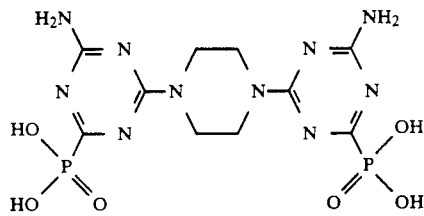

are obtained as a white crystalline powder having a higher m.p. than 300° C., and containing 14.03% of phosphorus (theoretical value: 14.28%).

EXAMPLE 7

To the same reaction apparatus of 3 liters of capacity as of Example 1, but initially provided with a cooling bath, 184.5 g of cyanuric chloride and 1300 cm³ of methylene chloride are charged.

While cooling from the outside, 87.2 g of morpholine and 40 g of sodium hydroxide dissolved in 150 cm³ of water are charged simultaneously during 3 hours, with the pH value being kept comprised within the range of from 5 to 7, and the temperature being kept comprised within the range of from 0° to 3° C.

The temperature is kept at 0°–3° C. for a further 3 hours, then the aqueous phase is separated.

By distilling off methylene chloride, 230 g of intermediate (XXIX):

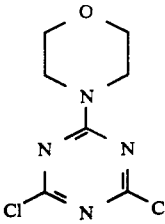

are obtained as a white crystalline powder having m.p.=155°–157° C.; purity higher than 98% (as determined by gaschromatography) and containing 29.87% of chlorine (theoretical value: 30.21%).

310 g of phosphorus trichloride and, at room temperature and with stirring, during 4 hours, a solution constituted by 208 g of 2,2-dimethyl-1,3-propanediol and 480 cm³ of chloroform are charged to a reactor of 2 liters of capacity, equipped as the preceding one and under nitrogen atmosphere. A constant development of hydrogen chloride occurs.

The reaction mixture is kept stirred for a further 2 hours, until the development of hydrogen chloride ends, then the solvent and unreacted phosphorus trichloride are distilled off. The residual product, consisting of 408 g of a thick liquid, is submitted to a further fractional distillation, and at 60° C. and 10 mmHg, 293.5 g of intermediate (XXX):

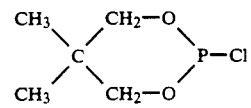

containing 20.98% of chlorine (theoretical value: 21.07%) and 18.31% of phosphorus (theoretical value: 18.40%) are obtained.

To the same reactor of 2 litres of capacity, 800 cm³ of ethyl ether and 286.4 g of intermediate (XXX) are charged.

The reaction mixture is cooled to 5° C. from the outside, and, with the temperature being kept comprised within the range of from 5° to 7° C., a solution constituted by 340 cm³ of ethyl ether, 142.0 of pyridine and 54.4 of methyl alcohol is charged during approximately 1 hour.

When the addition is complete, the temperature is allowed to increase to room temperature, and the reaction is kept stirred for 1 hour then is heated to boiling temperature and is kept refluxing for a further hour.

The reaction mixture is cooled down to 15° C. and then is filtered in order to separate pyridine chloride formed; the filter cake is washed on the filter with a small amount of ethyl ether.

The solvent is distilled off and a residue is obtained, which consists of 316 g of a liquid which is submitted to fractional distillation.

The fraction boiling at 62°–64° C. and 17 mmHg is collected. It is constituted by 254.8 g of the intermediate (XXXI):

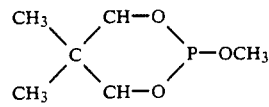

having the appearance of a colourless liquid containing 18.81% of phosphorus (theoretical value: 18.90%).

480 cm³ of orthodichlorobenzene, 141.2 of intermediate (XXIX) and 216.8 g of intermediate (XXXI) are charged to a reactor of 1 litre of capacity, equipped as in the preceding examples.

The mixture is heated to 160° C.; at about 140° C., the development of methyl chloride starts.

The reaction mixture is kept at 160° C. for 6 hours, until the development of methyl chloride ends.

The reaction mixture is allowed to cool down to room temperature and a precipitate is formed.

The product is filtered off and is washed on the filter with orthodichlorobenzene. The filter cake is taken up, inside the same reactor, with 400 cm³ of n-hexane, and is kept with stirring for 30 minutes.

The product is filtered off once more, and is washed on the filter with n-hexane.

By oven drying the filter cake at 100° C., 222.3 g of intermediate (XXXII):

(XXXII)

filtered off and is washed on the filter with a little of solvent.

The filter cake is treated, inside the same reactor, with 400 cm³ of water, and is kept stirred for 30 minutes.

The product is filtered off once more and is washed with water on the filter.

By oven drying the filter cake at 80° C., 68.8 of product:

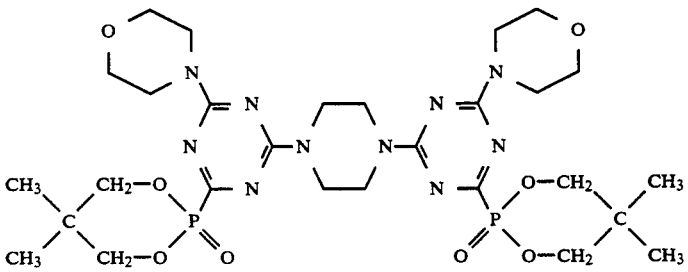

are obtained as a white crystalline powder having m.p.=280°-285° C. and containing 8.47% of phosphorus (theoretical content: 8.73%).

EXAMPLE 8

250 cm³ of water, 13.4 g of sodium hydroxide and 56.8 g of the product of Example 7 are charged to a reactor of 0.5 l of capacity, equipped as in the preceding examples.

The reaction mass is heated to 85° C. and is kept 1 hour stirred at that temperature.

The temperature is decreased to room temperature and the pH value is adjusted at 5-6 by means of the addition of an aqueous solution of hydrochloric acid.

The resulting product is filtered off and is washed with water on the filter.

By oven drying the filter cake at 100° C., 57.1 g of the product:

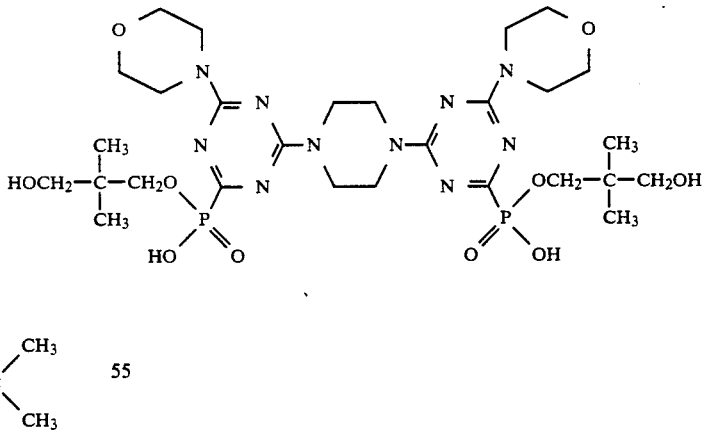

are obtained as a white crystalline powder having m.p.=236°-240° C. and containing 13.20% of phosphorus (theoretical value: 13.42%).

The structure of intermediate (XXXII) was confirmed by NMR analysis.

400 cm³ of dimethylsulfoxide, 115.5 g of intermediate (XXXII) and 10.7 g of piperazine are charged to a reactor of 1 litre of capacity equipped as the preceding ones.

The reaction mixture is kept 46 hours with stirring at room temperature, and then the separated product is are obtained as a white crystalline powder having a higher m.p. than 300° C. and containing 8.12% of phosphorus (theoretical content: 8.31%).

EXAMPLES 9-14

By operating under analogous conditions to as disclosed in Examples from 1 to 8, the products of general formula (I) reported in Table 2 are prepared.

In such a structure, $R_3$, when is present, is replaced by the triazinic ring of formula:

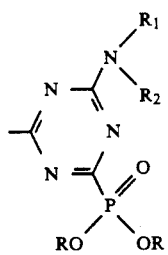

TABLE 2

| EXAMPLE No. | R | $R_1-N-R_2$ | $-Z-[-N(-[Z_2]_a)-Z_1-]_b-$ | Phosphorus % Calculated | Phosphorus % Found | m.p. (°C.) |
|---|---|---|---|---|---|---|
| 9 | H | N, S ring (thiomorpholine) | $-HNCH_2CH_2-N-CH_2CH_2NH-$ | 10,53 | 10,16 | >300 |
| 10 | H | N, N–CH₃ ring (N-methylpiperazine) | $-HN-(CH_2)_6-NH-$ | 9,84 | 10,07 | >300 |
| 11 | $C_2H_5$ $CH_2CH_2OH$ H | | $-N\underset{}{\diagdown}N-$ (piperazine) | 9,78 | 9,47 | 145–149 |
| 12 | H | piperidine | $-N\underset{}{\diagdown}N-$ (piperazine) | 10,88 | 10,71 | >300 |
| 13 | $CH_3$ $CH_2-CH=CH_2$ H | | dimethylpiperazine ($CH_3$, $CH_3$) | 10,37 | 10,02 | 242–246 |
| 14 | H | N, O ring (morpholine) | $HNCH_2$–(cyclohexyl)–$CH_2NH-$ | 9,84 | 9,51 | >300 |

TABLES 3 AND 4

The tests reported in the above said tables relate to polymeric compositions containing compounds of general formula (I) prepared according to the preceding examples.

Specimens were prepared, which consisted of slabs having a thickness of approximately 3 mm, by moulding compounds consisting of granular polymer and additives, on a platen press MOORE, with a moulding time of 7 minutes, by operating under a pressure of 40 kg/cm².

On the resulting slabs, the level of self-extinguishment is determined by measuring the respective values of oxygen index (L.O.I. according to ASTM D-2863/77) on a STANTON REDCROFT instrument, and applying the "Vertical Burning Test", which makes it possible to classify the material at the three levels 94 V-0, 94 V-1 and 94 V-2 according to UL 94 standards (published by "Underwriters Laboratories"— USA).

In Table 3, the values are reported which were obtained by using isotactic polypropylene flakes having a Melt Flow Index equal to 12, and containing 96% of insolubles in boiling n-heptane, by weight.

In Table 4, the values are reported which were obtained by using a low-density polyethylene in granular form having a Melt Flow Index of 7; a granular polystyrene containing 5% by weight of polybutadienic rubber and having a Melt Flow Index equal to 9; a thermoplastic polyester polyurethane (ESTANE 54600(TM) ex Goodrich), and a thermoplastic polyether polyurethane (ESTANE 58300(TM) ex Goodrich), both in granular form, having specific gravity values of 1.19 and 1.10 g/cm³, respectively; an elastomeric ethylene-propylene copolymer containing 45% by weight of propylene; an acrylonitrile-butadiene-styrene terpolymer having a specific gravity of 1.06 g/cm³, a Melt Flow Index of 1.6 and containing approximately 40% of acrylonitrile and styrene and 20% of butadiene.

TABLE 3

| Example No. | Product of Example No. | Parts by weight | | | L.O.I. (ASTM D 2863) | UL94 3 mm |
|---|---|---|---|---|---|---|
| | | Product | PP (1) | AO (2) | APP (1) | | |
| 15 | 1 | 14,7 | 77 | 1 | 7,3 | 31.2 | V1 |
| 16 | 1 | 9,6 | 75 | 1 | 14,4 | 36.1 | V0 |
| 17 | 2 | 12,0 | 75 | 1 | 12,0 | 32.3 | V0 |

TABLE 3-continued

| Example No. | Product of Example No. | Parts by weight | | | L.O.I. (ASTM D 2863) | UL94 3 mm |
|---|---|---|---|---|---|---|
| | | Product | PP (1) | A0 (2) | APP (1) | | |
| 18 | 3 | 34,0 | 65 | 1 | 0 | 34.9 | V0 |
| 19 | 3 | 12,0 | 75 | 1 | 12,0 | 36.8 | V0 |
| 20 | 3 | 17,0 | 65 | 1 | 17,0 | 42.5 | V0 |
| 21 | 4 | 9,6 | 75 | 1 | 14,4 | 32.8 | V0 |
| 22 | 5 | 12,0 | 75 | 1 | 12,0 | 31.4 | V0 |
| 23 | 6 | 34,0 | 65 | 1 | 0 | 33.1 | V0 |
| 24 | 6 | 12,5 | 74 | 1 | 12,5 | 33.8 | V0 |
| 25 | 7 | 12,0 | 75 | 1 | 12,0 | 32.7 | V0 |
| 26 | 8 | 15,0 | 75 | 1 | 9,0 | 31.8 | V0 |
| 27 | 9 | 34,0 | 65 | 1 | 0 | 32.4 | V0 |
| 28 | 10 | 34,0 | 65 | 1 | 0 | 33.6 | V0 |
| 29 | 11 | 13,0 | 75 | 1 | 11,0 | 32.7 | V0 |
| 30 | 12 | 35,0 | 64 | 1 | 0 | 31.4 | V0 |
| 31 | 12 | 15,0 | 69 | 1 | 15,0 | 33.2 | V0 |
| 32 | 13 | 12,5 | 74 | 1 | 12,5 | 34.3 | V0 |
| 33 | 14 | 14,5 | 71 | 1 | 13,5 | 33.6 | V0 |
| 34 | 1 | 17,0 | 65 | 1 | 17,0* | 38.0 | V0 |
| 35 | 7 | 9,6 | 75 | 1 | 14,4* | 34.0 | V0 |
| 36 | 3 | 19,9 | 73 | 1 | 6,5 (3) | 33.6 | V0 |

(1) PP = polypropylene
APP = Ammonium polyphosphate - Exolit 422 ® (Hoechst)
*APP microencapsulated with melamineformaldehyde resin Exolit 462 ® (Hoechst)
(2) A0 = antioxidant
A mixture constituted by 2 parts of dilauryl thiopropionate and 1 part of pentaerythritol tetra[3-(3,5-di-tert-butyl-4-hydroxyphenyl)propionate].
(3) APP replaced by the monoammonium salt of 1-aminoethane-1,1-diphosphonic acid

TABLE 4

| Example No. | Polymeric Support (1) | Product of Example No. | Parts by weight | | | | L.O.I. (ASTM D 2863) | UL94 3 mm |
|---|---|---|---|---|---|---|---|---|
| | | | Product | Polymer | A0 (2) | APP (1) | | |
| 37 | LDPE | 2 | 11.6 | 70 | 1 | 17.4 | 31.5 | V0 |
| 38 | LDPE | 4 | 13.6 | 65 | 1 | 20.4 | 38.1 | V0 |
| 39 | HIPS | 3 | 15.5 | 68 | 1 | 15.5 | 32.2 | V0 |
| 40 | HIPS | 4 | 13.6 | 65 | 1 | 20.4 | 30.4 | V0 |
| 41 | (Ester) PU | 6 | 29.0 | 70 | 1 | 0 | 33.2 | V0 |
| 42 | (Ester) PU | 9 | 29.0 | 70 | 1 | 0 | 34.8 | V0 |
| 43 | (Ether) PU | 9 | 29.0 | 70 | 1 | 0 | 30.7 | V0 |
| 44 | PP/PE | 3 | 20.0 | 70 | 1 | 9.0 | 33.2 | V0 |
| 45 | PP/PE | 10 | 24.0 | 70 | 1 | 5.0 | 30.4 | V0 |
| 46 | ABS | 9 | 13.5 | 72 | 1 | 13.5 | 32.7 | V0 |

(1) APP = ammonium polyphosphate - Exolit 422 ® (Hoechst)
LDPE = low density polyethylene
HIPS = polystyrene containing 5% of butadiene rubber
(ester) PU = polyester polyurethane
(ether) PU = polyether polyurethane
PP/PE = propylene-ethylene copolymer
ABS = acrylonitrile-butadiene-styrene terpolymer
(2) A0 = antioxidant
A mixture constituted by 2 parts of dilauryl thiopropionate and 1 part of pentaerythritol tetra[3-(3,5-di-tert-butyl-4-hydroxyphenyl)propionate].

EXAMPLE 47 (COMPARISON EXAMPLE)

600 cm³ of anhydrous ethyl alcohol and 146.7 g of intermediate (XXIII) are charged to a reactor of 1 litre of capacity, equipped as in Example 1.

The solution is cooled down to 0°-2° C. from the outside, and then is saturated with ammonia gas, with the temperature being kept comprised within the range of from 5° to 10° C.

The solution is left standing 40 hours at the temperature of about 15° C.

The formed product is filtered off and is washed on the filter, first with water and then with acetone.

By oven drying the filter panel at 80° C., 63.1 g of intermediate (XXXIII):

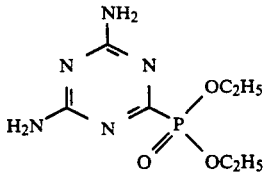
(XXXIII)

are obtained as a white crystalline powder having m.p.=271°-273° C. (with decomposition) and containing 12.44% of phosphorus (theoretical value: 12.55%).

To the same reaction equipment of 1 litre of capacity, 350 cm³ of acetonitrile, 49.4 of intermediate (XXXIII) and 60.0 g of sodium iodide are charged.

The reaction mixture is heated to 45° C. and at that temperature, 43,4 g of trimethylchlorosilane are fed within a time of 45 minutes.

The reaction is kept stirred at 45° C. for a further 4 hours, then the process is continued according to as disclosed in Examples 3 and 6.

29.2 g of 2,4-diamino-1,3,5-triazinyl-6-phosphonic acid (XXXIV):

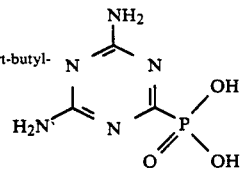
(XXXIV)

are obtained as a white crystalline powder having a higher m.p. than 300° C. and containing 15.92% of phosphorus (theoretical value: 16.23%).

By operating according to the same modalities as used in Examples from 15 to 36, using the product (XXXIV), the following composition is prepared:

| Polypropylene: | 65 parts by weight |
|---|---|
| Antioxidant: | 1 part by weight |
| Product (XXXIV): | 34 parts by weight |

By using the above said composition, specimens were prepared which were submitted to self-extinguishment tests according to the same modalities as disclosed hereinabove.

The following results were obtained:
L.O.I. = 25.3
UL94 (3 mm): class B (the specimen burns).

EXAMPLE 48 (COMPARISON EXAMPLE)

By operating as in Example 47, the following composition is prepared:

| Polypropylene: | 73 parts by weight |
| Antioxidant: | 1 part by weight |
| Ammonium polyphosphate: | 13 parts by weight |
| Product (XXXIV): | 13 parts by weight |

By using the above said composition, specimens were prepared which were submitted to self-extinguishment tests according to the same modalities as disclosed hereinabove.

The following results were obtained:
L.O.I. = 26.1
UL94 (3 mm): class B (the specimen burns).

We claim:

1. Self-extinguishing polymeric compositions comprising:
   (a) from 90 to 40 parts by weight of a thermoplastic polymer, or of a polymer endowed with elastomeric properties;
   (b) from 10 to 60 parts by weight of one or more derivatives of 2,4-diamino-1,3,5-triazinyl-6-phosphonic acid having the formula (I):

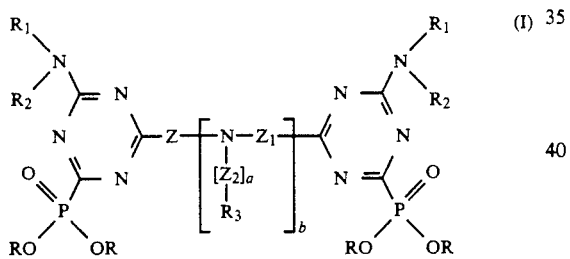

wherein:
the radicals R, which may be the same, or different from each other, are:
hydrogen; $C_1$-$C_5$ alkyl; $C_3$-$C_5$ hydroxyalkyl; $C_3$-$C_4$ alkenyl; cyclohexyl; $C_6$-$C_{10}$ aryl; $C_7$-$C_8$ aralkyl; or, taken jointly, may constitute a cyclic structure, as:

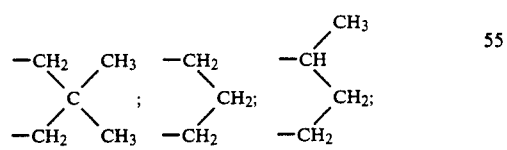

the radicals $R_1$ and $R_2$, which may be the same, or different from each other, and which may have different meanings on each triazinic ring, are:

H; $C_1$-$C_{18}$ alkyl; $C_2$-$C_8$ alkenyl; $C_6$-$C_{16}$ cycloalkyl or alkylcycloalkyl;

$$-CH_2 + C_mH_{2m} + O - R_4;$$

-continued

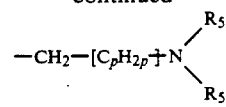

wherein:
m = an integer comprised within the range of from 1 to 7;
p = an integer comprised within the range of from 1 to 5;
$R_4$ = H; $C_1$-$C_8$ alkyl; $C_2$-$C_6$ alkenyl; —[—$C_q$—$H_{2q}$—]—O—$R_6$ wherein q is an integer comprised within the range of from 1 to 4 and $R_6$ is H or $C_1$-$C_4$ alkyl; $C_6$-$C_{12}$ cycloalkyl or alkylcycloalkyl;
the radicals $R_5$, which may be the same, or different from each other, are:
H; $C_1$-$C_8$ alkyl; $C_2$-$C_6$ alkenyl; $C_6$-$C_{12}$ cycloalkyl or alkylcycloalkyl; $C_1$-$C_4$ hydroxyalkyl;
or the moiety:

is replaced by a heterocyclic radical selected from the group consisting of aziridine; pyrrolidine; piperidine; morpholine; thiomorpholine; piperazine; 4-methylpiperazine; and 4-ethylpiperazine, linked to the alkyl chain through the nitrogen atom;
or in the general formula (I) the moiety:

is replaced by a heterocyclic radical selected from the group consisting of aziridine, pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; and 2,5-diethylpiperazine, linked to the triazinic ring through the nitrogen atom;
a is 0 (zero) or 1;
b is 0 (zero) or an integer comprised within the range of from 1 to 5;
$R_3$ is hydrogen or:

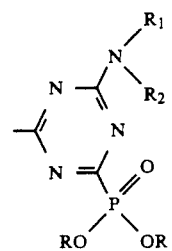

and its meaning may vary within each repeating unit; when b is 0 (zero), z is a divalent radical falling within the scope of one of the following formulae:

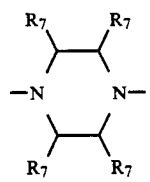

wherein the radicals $R_7$, which may be the same or different from each other, are hydrogen or $C_1$-$C_4$ alkyl;

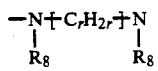

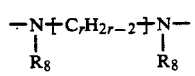

wherein r is an integer comprised within the range of from 2 to 14; $R_8$ is hydrogen; $C_1$-$C_4$ alkyl; $C_2$-$C_6$ alkenyl; $C_1$-$C_4$ hydroxyalkyl;

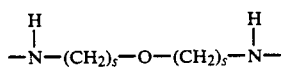 (V)

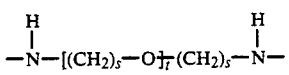 (VI)

wherein s is an integer comprised within the range of from 2 to 5 and t is an integer comprised within the range of from 1 to 3;

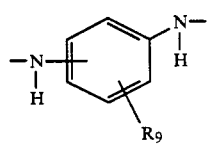 (VII)

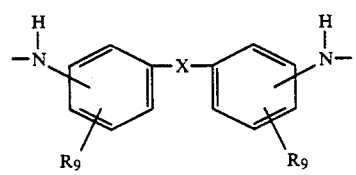 (VIII)

wherein:
X is a direct C—C bond; O; S; S—S; SO; $SO_2$; NH; $NHSO_2$; NHCO; N=N; $CH_2$;
$R_9$ is hydrogen; hydroxy; $C_1$-$C_4$ alkyl; $C_1$-$C_4$ alkoxy;

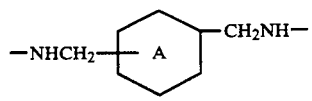 (IX)

wherein A may be a saturated or unsaturated ring;

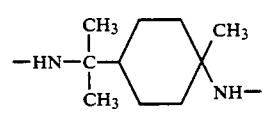 (X)

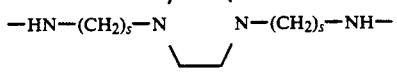 (XI)

wherein s has the above defined meaning;
when, on the contrary, b is an integer comprised within the range of from 1 to 5, the moiety:

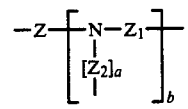

is a multivalent radical falling within the scope of one of the following formulae:

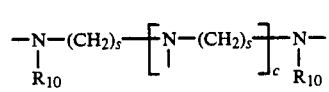 (XII)

wherein:
$R_{10}$ is hydrogen or $C_1$-$C_4$ alkyl;
c is an integer comprised within the range of from 1 to 5; the indexes s, which may be the same, or different from each other, have the same meaning as defined above;

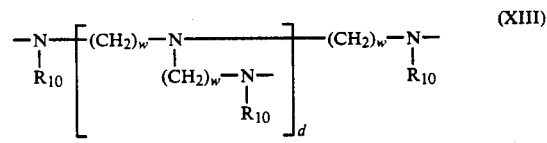 (XIII)

wherein:
$R_{10}$ has the same meaning as defined above;
w is an integer comprised within the range of from 2 to 4; and
d is either 1 or 2.

2. Self-extinguishing polymeric compositions according to claim 1, in which at least one of radicals $R_1$ and $R_2$ in general formula (I) is replaced by a moiety:

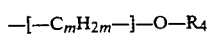

wherein:
m is an integer comprised within the range of from 1 to 3 and $R_4$ is hydrogen or $C_1$-$C_4$ alkyl.

3. Self-extinguishing polymeric compositions according to claim 1, in which the radicals R, in the formula (I), are equal to hydrogen.

4. Self-extinguishing polymeric compositions according to claim 1, comprising:
from 90 to 40 parts by weight of component (a);
from 9 to 35 parts by weight of component (b); and
from 1 to 25 parts by weight of one or more ammonium or amine phospate(s) and/or phosphonates (c).

5. Self-extinguishing polymeric compositions according to claim 4, in which ammonium phosphate(s) (c) has(have) the general formula $(NH_4)_{n+2}P_nO_{3n+1}$ in which n is an integer equal to, or larger than, 2.

6. Self-extinguishing polymeric compositions according to claim 4, in which ammonium phosphate(s) (c)

has(have) the general formula $(NH_4PO_3)_n$ in which n is an integer comprised within the range of from 50 to 500.

7. Self-extinguishing polymeric compositions according to claim 4, in which amine phosphate(s) (c) is(are) selected from dimethylammonium or diethylammonium phosphate; ethylenediamine phosphate; melamine ortho or pyrophosphate.

8. Self-extinguishing polymeric compositions according to claim 1, in which the polymer (a) is selected from among polymers or copolymers of olefins having the formula $R-CH=CH_2$ wherein R is a hydrogen atom or a $C_1-C_8$ alkyl or aryl radical; acrylonitrile-butadiene-styrene terpolymers; styrene-acrylonitrile copolymers; polyurethane; poly-(ethyleneterephthalate); poly-(butyleneterephthalate); or polyamides.

9. Self-extinguishing polymeric compositions according to claim 8, wherein the polymers and copolymers of olefins are selected from:
   a) isotactic or prevailingly isotactic polypropylene;
   b) HDPE, LLDPE, LDPE polyethylene;
   c) crystalline propylene copolymers with minor proportions of ethylene and/or other alpha-olefins, such as, e.g.: 1-butene, 1-hexene, 1-octene, 4-methyl-1-pentene;
   d) heterophasic compositions comprising: (A) a homopolymeric propylene fraction, or one of the copolymers as per above (c) point, and (B) a copolymeric fraction formed by elastomeric ethylene copolymers with an alpha-olefin, possibly containing minor proportions of a diene, wherein the alpha-olefin is preferably selected from propylene and 1-butene;
   e) elastomeric ethylene copolymers with alpha-olefins, possibly containing minor proportions of a diene.

10. Molded articles of manufacture, obtained from the compositions according to claim 1.

* * * * *